United States Patent [19]

Zollinger

[11] E Re. 31,024

[45] Reissued Sep. 7, 1982

[54] YARN TENSIONING DEVICE

[75] Inventor: Otto Zollinger, Spartanburg, S.C.

[73] Assignee: Otto Zollinger, Inc., Spartanburg, S.C.

[21] Appl. No.: 952,938

[22] Filed: Oct. 19, 1978

Related U.S. Patent Documents

Reissue of:

[64] Patent No.: 3,892,371
Issued: Jul. 1, 1975
Appl. No.: 368,735
Filed: Jun. 11, 1973

U.S. Applications:

[63] Continuation-in-part of Ser. No. 297,995, Oct. 16, 1972, Pat. No. 3,753,535.

[51] Int. Cl.[3] ..... B65H 59/22
[52] U.S. Cl. ..... 242/152.1
[58] Field of Search ..... 242/152.1, 151, 149, 242/147 R, 147 M, 129.8, 157 R; 226/91, 97, 195

[56] References Cited

U.S. PATENT DOCUMENTS

| | | | |
|---|---|---|---|
| 855,803 | 6/1907 | Palmer | 242/157 C |
| 1,040,185 | 10/1912 | Gerstberger | 242/152.1 |
| 1,306,148 | 6/1919 | Houghton | 242/152.1 UX |
| 1,490,512 | 4/1924 | Hill et al. | 242/152.1 |
| 2,222,921 | 11/1940 | Van Den Bergh | 242/152.1 X |
| 2,373,513 | 4/1945 | Stevenson | 242/152.1 |

FOREIGN PATENT DOCUMENTS

| | | | |
|---|---|---|---|
| 41573 | 9/1965 | Fed. Rep. of Germany . | |
| 855300 | 2/1940 | France | 242/152.1 |

*Primary Examiner*—Stanley N. Gilreath
*Attorney, Agent, or Firm*—Wellington M. Manning, Jr.; Luke J. Wilburn, Jr.

[57] ABSTRACT

A device is disclosed for tensioning a running length of textile yarn. The device in its simplest form is made up of a housing with a yarn passageway extending therethrough. An annular seat is provided in the passageway and provides a surface for receiving a spherical element thereat with the element being out of contact with walls of the passageway while at rest on the seat. Relative dimensions of the passageway and the seat are such that the spherical element is precluded against lateral movement away from the seat, whereby the spherical element constantly applies tension against a yarn passing between the seat and the spherical element. The passageway further extends above the spherical element at the seat and may receive a plurality of elements if desired.

17 Claims, 5 Drawing Figures

YARN TENSIONING DEVICE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application, Ser. No. 297,995, filed Oct. 16, [1973] *1972*, now U.S. Pat. No. 3,753,535.

BACKGROUND OF THE INVENTION

Numerous devices have heretofore been produced for the tensioning of a running length of textile yarn. Further, certain of these devices have incorporated the use of a spherical element such as a ball which is received in a conical support through which yarn passes. The weight of the ball thus rests on the support, impeding the progress of yarn passing therebetween. These prior art devices have, however, been deficient for numerous reasons. For example, the majority of the devices are substantially enclosed, thus hindering feeding of yarn therethrough. Further, other of the devices are restricted to particular types of yarn. Still further, other devices operate on a principle different from that of the instant invention, though a yarn passageway and a spherical element are involved.

The present invention thus provides an improved yarn tensioning device over those of the prior art, wherein a spherical element resides on a seat and engages yarn passing therethrough so as to impede the progress of the yarn by a predetermined amount. The device of the present invention further possesses certain definite advantages over the prior art. For example, it is easily manufactured, threading of yarn is quite simple and quick; no surfaces are available for abrasion of the yarn or for collection of lint and slubs; and tension is automatically maintained without any adjustments after start up.

The prior art is devoid of any teaching or suggestion of the present invention. Exemplary of the prior art are U.S. Pat. Nos. 1,408,560 to Bingham et al; 1,432,399 to Land; 1,490,512 to Hill et al; 1,785,987 to Stewart; 2,373,513 to Stevenson; and 2,222,921 to Van Den Bergh.

SUMMARY OF THE INVENTION

It is an object of the present invention to provide an improved yarn tensioning device.

Still further, another object of the present invention is to provide an improved device of the tensioning of a running length of textile yarn utilizing at least one spherical element applying force against the yarn.

Generally speaking, the device of the present invention comprises a housing, said housing having a yarn passageway extending therethrough; an annular seat received in said passageway to receive a spherical element thereat and hold said element out of contact with walls defining said passageway when said element resides at said seat; and a spherical element receivable in said passageway, said spherical element engaging a yarn passing through said seat and continuously applying tension against same, said passageway and said seat being relatively sized to preclude permanent lateral movement of said spherical element away from said seat.

More specifically, the device of the present invention provides an elongated yarn passageway through a housing, with the passageway generally having straight sides therealong. Internally of the housing, the passageway preferably tapers to a medium diameter section which extends further axially inwardly of the housing and terminates at a small diameter passageway which extends throughout the remainder of the housing. At the junction of the medium and small passageways, an annular seat is provided for a spherical element that is received therein. Preferably the seat is provided by a ceramic insert that is received in and extends through the small diameter passageway beyond the opposite end of the housing. The spherical element that is received within the medium diameter section of the passageway resides on the seat and is retained thereat by the wall of the medium diameter section of the passageway. Hence, while there is a loose fit between the spherical element and the medium diameter section of the passageway, there is very little play therebetween, whereby the spherical element is held against any substantial lateral movement.

Appropriate mounting means are also preferably secured to the housing and are employed to secure the device to a portion of a yarn handling textile machine. A preferred mounting means is a bracket that is integral with the housing and extends outwardly therefrom transverse to the direction of the passageway. An elongated slot that is axial with respect to the bracket extends therealong, whereby the tension device may be secured at a predetermined position on the yarn handling machine so as to receive a yarn passing therethrough. Most yarn handling machines have a large number of adjacent yarn positions thereon. Each of the positions would be thus equipped with an individual tension device according to the teachings of the present invention.

Feeding of yarn into the tension device of the present invention is quite quick and simple. Compressed air may be introduced at the lower end of the device. The compressed air overcomes the weight of the spherical element and forces the element off the seat into the passageway. While the element remains suspended in air, yarn is placed into the small diameter passageway, is picked up by the air stream and carried therewith, passing around the spherical element and out the opposite upper end of the device. The pressurized air is then removed and the spherical element falls back towards the seat and entraps the yarn between the element and the seat. Thereafter, as the yarn begins to move, the force of the moving yarn partially overcomes the weight of the spherical element and causes the spherical element to rotate at the seat. Depending upon the speed at which the yarn is traveling, the size of the yarn, and the number and size of the spherical elements employed, the final placement of the spherical element may vary. It should be pointed out, however, that the size, weight and number of spherical elements are predetermined with respect to the physical dimensions of the passageway such that when the spherical element is present in the large diameter section of the passageway, the pressurized air, if employed, may pass freely therearound without sufficient force to expel the spherical element from within the housing. The upper end of the passageway may thus be unrestricted without danger of losing the spherical element during feeding.

Yarn may also be fed through the present tension device by affixing the yarn to a thin elongated instrument and pushing the instrument upwardly through the passageway, forcing the spherical element off the seat and passing therearound.

The medium diameter section of the passageway performs yet another function. In many situations it becomes desirable to angularly disposed the tension device with respect to vertical. The restricted dimensions of the medium diameter section of the passageway, both diameter and length, thus hold the spherical element over the seat and in proper position for tensioning the yarn regardless of whether the device is in a vertical position or angularly disposed.

The annular seat employed according to the present invention may be integral with the housing or may be provided by an appropriate insert. The seat has an annular opening extending therethrough with the spherical element engaging surfaces around said opening having a radius in a direction opposite the radius of curvature of the spherical element. As such, tangential point type contact is made between the spherical element and the seat, whereby a coil, neb, knot, or the like in yarn being tensioned will cause the spherical element to pivot upwardly about one area of contact and thereafter immediately fall back onto the seat.

The device of the present invention may be of integral construction or may be made of component parts.

DESCRIPTION OF THE PREFERRED EMBODIMENTS

Figure 1:
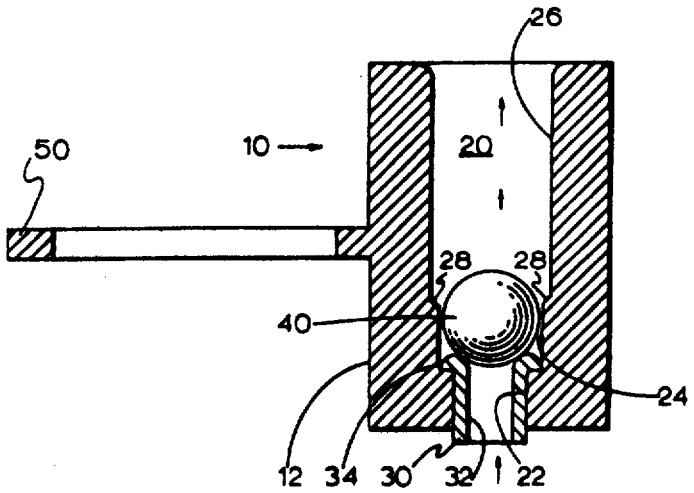
FIG. 1 is a side cross sectional view of a yarn tension device according to the present invention.
Figure 2:
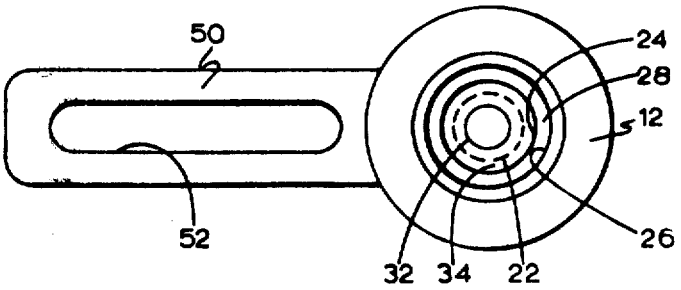
FIG. 2 is a top view of a device as shown in FIG. 1.

Making reference to the drawings, preferred embodiments of the present invention will now be described in detail. FIGS. 1 and 2 illustrate a tension control device according to the present invention generally indicated as 10. Tension control device 10 is preferably employed on any yarn handling machine at a particular deposition with yarn passing therethrough in the direction indicated by the arrows, though other arrangements are possible.

Tension device 10 is made up of a housing 12 having a yarn passageway 20 extending completely therethrough. Yarn passageway 20 is preferably comprised of a small diameter section 22, a medium diameter section 24 and a large diameter section 26. The small diameter section 22 is located at the bottom of housing 12 and has an insert 30 received therein, the purpose of which will be described hereinafter. Insert 30 contains an annular passage 32 extending therethrough and has an upper end 34 that may be enlarged to the approximate size of medium diameter passageway section 24 and defines a continuous seat thereat. All of the surfaces on insert 30 that come into contact with yarn are smooth with rounded edges, and preferably, insert 30 is manufactured of a ceramic composite that exhibits long wear characteristics when in constant engagement with a moving textile yarn. As may be better seen in FIG. 3, the contact surface of insert 30 has rounded edges that define a continuous radius of opposite curvature to that of the spherical element to be received thereon. In other words, the seat 34 defined by insert 30 is preferably provided with arcuate surfaces around annular opening 32. Hence a spherical element residing on the seat 34 makes limited contact therewith at tangential points around the spherical element and seat 34.

At least one spherical element 40 is received in passageway 20 and resides in medium diameter section 24 on seat 34 of insert 30. Spherical element 40 is preferably a stainless steel ball of a predetermined weight and diameter relative to the diameters of medium diameter section 24 and large diameter section 26 of tubular passageway 20. In this fashion, spherical element 40 closely approximates the diameter of mid section 24 so as to be held on seat 34 against lateral movement therefrom. As such, should it become desirable to position tension device 10 angularly with respect to vertical, spherical element 40 will not roll off seat 34. In fact, a preferred form of tension device 10 may be positioned at an angle of approximately 70° on either side of vertical before element 40 moves off seat 34. In those embodiments where only a large diameter section 26 and a small diameter section 22 are present, the section dimensions at seat 34 are likewise such that spherical element 40 will not undergo sufficient lateral movement at seat 34 to lose tension control on a yarn passing therethrough (See FIG. 5).

Large diameter section 26 of tubular passageway 20 has a diameter that substantially exceeds the diameter of spherical element 40, the purpose of which will be defined hereinafter. At the junction of sections 24 and 26 of passageway 20, tapered wall sections 28 are provided. The remainder of the passageway areas, are preferably straight, though the walls of section 26 may taper gradually outwardly from the junction with section 24. Hence, when spherical element 40 is up within large diameter section 26, and pressure thereon is removed, element 40 falls by gravity to the bottom of section 26, and is guided by tapered walls 28 into medium diameter section 24 to properly reside on seat 34 of insert 30.

Also making reference to FIGS. 1 and 2, a mounting means 50 is secured to housing 12 so as to facilitate securement of device 10 to the yarn handling machine. As illustrated in the Figures, the preferred embodiment is a bracket 50 which has an elongated slot 52 extending therealong. Tension device 10 may thus be adjustably mounted with respect to the source of yarn and/or the delivery point on the yarn handling machine (not shown). The particular yarn handling machines that may suitably use the device of the present invention are well within the purview of one skilled in the art and illustration thereof is not believed necessary.

Figure 3:
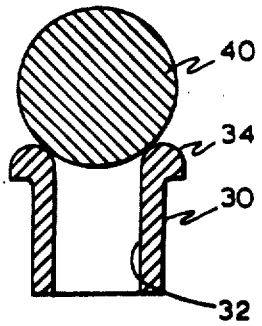
FIG. 3 is a side cross sectional view of the relationship of a spherical element to an annular seat according to a preferred embodiment of the present invention.
Figure 4:
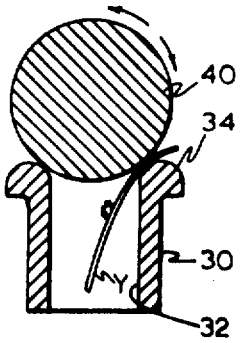
FIG. 4 is a side cross sectional view as shown in FIG. 3, illustrating yarn passing therethrough.

FIG. 3 illustrates the relationship between spherical element 40 and seat 34. As mentioned above, seat 34 is uninterrupted around annular opening 32 and curved around annular opening 32 in a direction opposite the curvature of spherical element 40. A peripheral contact is thus made at tangential points around element 40 and seat 34. Thus as shown in FIG. 4, when a thick spot, knit, curl, twist or the like appears in yarn Y, spherical element 40 pivots or rocks around the point of contact with seat 34 opposite the yarn Y while continuing to maintain tensioning contact with yarn Y. After passage of the flow by element 40, element 40 rocks on pivots back to the original position as shown in FIG. 4. Movement of element 40 is illustrated by the double headed arrow. This action of spherical element 40 permits constant tension control on yarn Y as the yarn passes through tension device 10.

Figure 5:
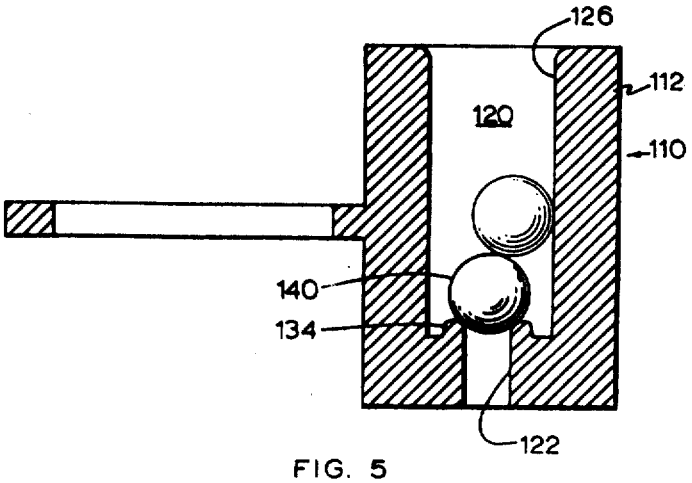
FIG. 5 is a side cross sectional view of a yarn tension device according to the present invention illustrating a particular embodiment thereof.

FIG. 5 illustrates another embodiment of the present invention. A tension device 110 is shown having a housing 112 with a passageway 120 extending therethrough. Passageway 120 has a small diameter section 122 and a large diameter section 126. An annular seat 134 is integral with housing 112 and positioned adjacent the junction of passageway sections 122 and 126, with section 122 passing therethrough. Seat 134 is provided with a continuous arc emanating from passageway section 122 and extending outwardly therefrom. A spherical element 140 is receivable in large section 126 of passageway 120 and normally resides at seat 134, making tangential contact with seat 134 therearound. Yarn passes through section 122 of passageway 120, between spherical element 140 and seat 134 and through passageway section 126. The weight of spherical element 140 applies force against the yarn and constantly tensions same against seat 134.

The tension device according to the present invention may be manufactured as desired from any suitable material that will withstand the abrasion caused by yarn passing thereover without being damaged, or without causing damage to the yarn. Plastic materials are very suitable due to the ease of use in manufacture of the device and the economics thereof. Injection molding is thus quite acceptable as a manufacturing technique for producing the instant tension device. As mentioned above, however, a ceramic composite insert is preferred due to the expected wear at that particular part of the device, along with a stainless steel spherical element. In the integral construction of the tension device of the present invention which may take the form of any of the embodiments set forth, a ceramic material is preferably utilized that exhibits a smooth surface at all contact points and resists wear due to abrasion by the yarn. Aluminum oxide is a preferred material of construction.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A tension device comprising:

a. a housing, said housing having a yarn passageway extending therethrough, said yarn passageway having a small diameter section and a large diameter section;

b. an uninterrupted annular seat located in said large diameter section of said passageway at the junction of said large and small diameter sections, said seat having an annular opening passing therethrough and presenting a smooth arcuate surface extending from said opening outwardly therefrom, the curvature of said arcuate surface being in a direction opposite the curvature of a spherical element receivable thereat *said seat being defined by an insert received in said yarn passageway*; and c. a spherical element receivable in said large diameter section of said passageway, said spherical element having a diameter less than the length of said large diameter section of said passageway and said large diameter section of said passageway at said seat and said spherical element being comparatively sized such that said spherical element may reside at said seat out of contact with walls of said large diameter section of said passageway when no yarn is passing through said opening and such that substantial lateral movement of said spherical element is precluded whereby said spherical element continuously controls tension on a yarn passing thereby *said passageway being smooth surfaced and substantially unrestricted upwardly from said seat for a distance sufficient to permit substantially unrestricted upward movement of said spherical element during tensioning of a yarn.*

2. A yarn tension device as defined in claim 1 wherein said housing and seat of said device are of integral construction.

3. A yarn tension device as defined in claim 2 wherein said device is manufactured of a ceramic material.

4. A yarn tension device as defined in claim 1 wherein said large diameter section of said yarn passageway includes a large diameter [section] portion, *and* a medium diameter portion[, and wherein said seat is provided by an insert received in said small diameter section of said passageway].

5. A yarn tension device as defined in claim 4 wherein the medium diameter portion of said large diameter section is provided adjacent said seat.

6. A yarn tension device as defined in claim 5 wherein said large diameter portion tapers in to said medium diameter portion.

7. A yarn tension device as defined in claim 1 wherein said yarn passageway has straight walls adjacent said seat.

8. A yarn tension device as defined in claim 1 wherein said housing has mounting means secured thereto.

9. A yarn tension device as defined in claim 8 wherein said mounting means comprise a member secured to said housing and extending outwardly therefrom, said member having an elongated slot therealong.

10. A yarn tension device as defined in claim 9 wherein said member is integral with said housing.

11. A yarn tension device as defined in claim 1 wherein a plurality of spherical elements are received in said passageway, said spherical element being positioned one above the other.

12. A yarn tension device as defined in claim 1 wherein said yarn passageway extends above said seat throughout said housing at no substantial decrease in diameter.

13. A tension device comprising:

a. a plastic housing, said housing having a yarn passageway extending therethrough, said passageway having a large diameter section and a small diameter section, said large diameter section having walls defining same that extend generally axially with respect to the housing, said housing further having a mounting member secured thereto and extending outwardly therefrom, b. an abrasion resistant insert received in said small diameter section of said passageway, said insert being uninterrupted therearound and having an annular opening therethrough, said insert having arcuate surfaces around said opening, said arcuate surfaces having a radius of curvature in a direction opposite the direction of curvature of a spherical element receivable thereat, said opening and arcuate surfaces defining a seat for a spherical element at the junction of said large and small diameter sections; and c. a spherical element receivable in said large diameter section of said passageway and being residable at said seat while not making contact with walls of said passageway when no yarn is passing through said opening, said spherical element having a diameter less than the length of said large diameter section of said passageway and the diameter of said large diameter section of said passageway at said seat being such that said spherical element is precluded from substantial lateral movement whereby said spherical element continuously tensions a yarn passing thereby *said passageway being smooth surfaced and substantially unrestricted upwardly from said seat for a distance sufficient to permit substantially unrestricted upward movement of said spherical element during tensioning of a yarn.*

14. A yarn tension device as defined in claim 13 wherein said mounting member is integral with said housing and has an elongated slot therealong.

15. A yarn tension device as defined in claim 13 wherein said large diameter section of said passageway has a diameter at an upper end thereof that is at least as large as the diameter of the passageway at said seat.

*16. A tension device comprising:*

*(a) a housing, said housing having a yarn passageway extending therethrough, said yarn passageway having a small diameter section and a large diameter section;*

*(b) an insert received along said passageway defining an uninterpreted annular seat located in said passageway at the junction of said large and small diameter sections, said seat having an annular opening passing therethrough and presenting a smooth arcuate surface extending from said opening outwardly therefrom, the curvature of said arcuate surface being in a direction opposite the curvature of a spherical element receivable thereat; and*

*(c) a spherical element receivable in said large diameter section of said passageway, said spherical element having a diameter less than the length of said large diameter section of said passageway and said large diameter section of said passageway at said seat and said spherical element being comparatively sized such that the said spherical element may reside at said seat out of contact with walls of said large diameter section of said passageway when no yarn is passing through said opening and such that substantial lateral movement of said spherical element is precluded whereby said spherical element continuously controls tension on a yarn passing thereby, said large diameter passageway extending above said seat for at least a distance to receive two spherical elements therein and permit substantially unrestricted upward movement of the number of spherical elements utilized therein, said large diameter section of said passageway having smooth walls and being unrestricted along said distance, during tensioning of a yarn.*

*17. A tension device as defined in claim 16 wherein the large diameter section of said passageway is substantially unrestricted for substantially the length of the housing above the seat.*

* * * * *